(12) United States Patent
Jayant et al.

(10) Patent No.: US 8,987,929 B2
(45) Date of Patent: Mar. 24, 2015

(54) SYSTEM AND METHOD FOR OPERATING WIND FARM

(71) Applicant: General Electric Company, Schenectady, NY (US)

(72) Inventors: Aditya Jayant, Bangalore (IN); Shimnamol Padmanabhan Nair, Bangalore (IN); Vincent Arokiasamy, Bangalore (IN); Santhosha Yelwal Srikanta, Yelwal (IN)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/666,005

(22) Filed: Nov. 1, 2012

(65) Prior Publication Data

US 2014/0117668 A1    May 1, 2014

(51) Int. Cl.
| | |
|---|---|
| *F03D 9/00* | (2006.01) |
| *H02P 9/04* | (2006.01) |
| *B64C 11/00* | (2006.01) |
| *B64C 27/00* | (2006.01) |
| *G05D 11/00* | (2006.01) |
| *G05D 17/00* | (2006.01) |
| *G05D 3/12* | (2006.01) |

(Continued)

(52) U.S. Cl.
CPC .......... *F03D 7/0224* (2013.01); *F05B 2270/111* (2013.01)
USPC ..................... 290/44; 290/55; 416/1; 700/287

(58) Field of Classification Search
CPC ........... F05B 2240/96; F05B 2270/321; F05B 2270/404; F05B 2270/3201; Y02E 10/72; Y02E 10/74; Y02E 40/72; Y02E 60/7838; F03D 7/048; F03D 7/047; F03D 11/0091; F03D 11/04; F03D 7/0284; F03D 9/005; F03D 7/02
USPC .............. 290/44, 55; 700/286, 287, 288, 290; 415/1; 416/1
See application file for complete search history.

(56) References Cited

U.S. PATENT DOCUMENTS

| | | | |
|---|---|---|---|
| 6,619,918 | B1 | 9/2003 | Rebsdorf |
| 7,004,724 | B2 | 2/2006 | Pierce et al. |

(Continued)

FOREIGN PATENT DOCUMENTS

| | | |
|---|---|---|
| EP | 1701034 | 9/2006 |
| EP | 1788237 | 5/2007 |

(Continued)

OTHER PUBLICATIONS

Search report issued in connection with EP Application No. 13190875.8, Jan. 15, 2014.

*Primary Examiner* — Tulsidas C Patel
*Assistant Examiner* — Charles Reid, Jr.
(74) *Attorney, Agent, or Firm* — Dority & Manning, P.A.

(57) ABSTRACT

Systems and methods for operating a wind farm are disclosed. The method includes detecting an operating condition of an upwind wind generator, the upwind wind generator located upstream of a downwind wind generator relative to a wind flow direction. The method further includes communicating a control signal to the downwind wind generator. The control signal is based on the operating condition. The method further includes beginning to adjust the downwind wind generator according to the control signal before the wind flow is experienced by the downwind wind generator.

17 Claims, 3 Drawing Sheets

(51) Int. Cl.
*G05D 5/00* (2006.01)
*G05D 9/00* (2006.01)
*F03D 7/02* (2006.01)

(56) References Cited

U.S. PATENT DOCUMENTS

| | | | |
|---|---|---|---|
| 7,025,567 B2 * | 4/2006 | Wobben | 416/1 |
| 7,298,059 B2 | 11/2007 | Delmerico et al. | |
| 7,342,323 B2 | 3/2008 | Avagliano et al. | |
| 7,392,114 B2 | 6/2008 | Wobben | |
| 7,436,083 B2 | 10/2008 | Shibata et al. | |
| 7,476,985 B2 | 1/2009 | Gonzalez | |
| 7,573,149 B2 | 8/2009 | Kammer et al. | |
| 7,638,893 B2 | 12/2009 | Wobben | |
| 7,649,282 B2 | 1/2010 | Jurkat et al. | |
| 7,756,609 B2 | 7/2010 | Jurkat et al. | |
| 8,025,476 B2 * | 9/2011 | Zheng et al. | 415/1 |
| 8,046,109 B2 * | 10/2011 | Larsen et al. | 700/293 |
| 8,057,158 B2 | 11/2011 | Seidel et al. | |
| 2004/0258521 A1 | 12/2004 | Wobben | |
| 2005/0090937 A1 * | 4/2005 | Moore et al. | 700/286 |
| 2007/0216166 A1 | 9/2007 | Schubert | |
| 2009/0047116 A1 * | 2/2009 | Barbu et al. | 415/1 |
| 2009/0281675 A1 * | 11/2009 | Rasmussen et al. | 700/287 |
| 2010/0138182 A1 * | 6/2010 | Jammu et al. | 702/113 |
| 2010/0305767 A1 * | 12/2010 | Bengtson | 700/287 |
| 2011/0160925 A1 * | 6/2011 | Zhu et al. | 700/287 |
| 2012/0010755 A1 * | 1/2012 | Stapelfeldt | 700/287 |
| 2012/0010759 A1 * | 1/2012 | Larsen et al. | 700/292 |
| 2012/0066604 A1 * | 3/2012 | Vasudevarao et al. | 715/735 |
| 2012/0257968 A1 * | 10/2012 | Dalsgaard | 416/1 |
| 2013/0259686 A1 * | 10/2013 | Blom et al. | 416/1 |
| 2013/0277970 A1 * | 10/2013 | Dange et al. | 290/44 |

FOREIGN PATENT DOCUMENTS

| | | |
|---|---|---|
| EP | 2123906 | 11/2009 |
| WO | WO 97/09531 | 3/1997 |
| WO | WO 2009/010059 | 1/2009 |
| WO | WO 2010/112109 | 10/2010 |
| WO | WO 2011/000453 | 1/2011 |
| WO | WO 2011072689 A2 * | 6/2011 |
| WO | WO 2010/084131 | 11/2011 |

* cited by examiner

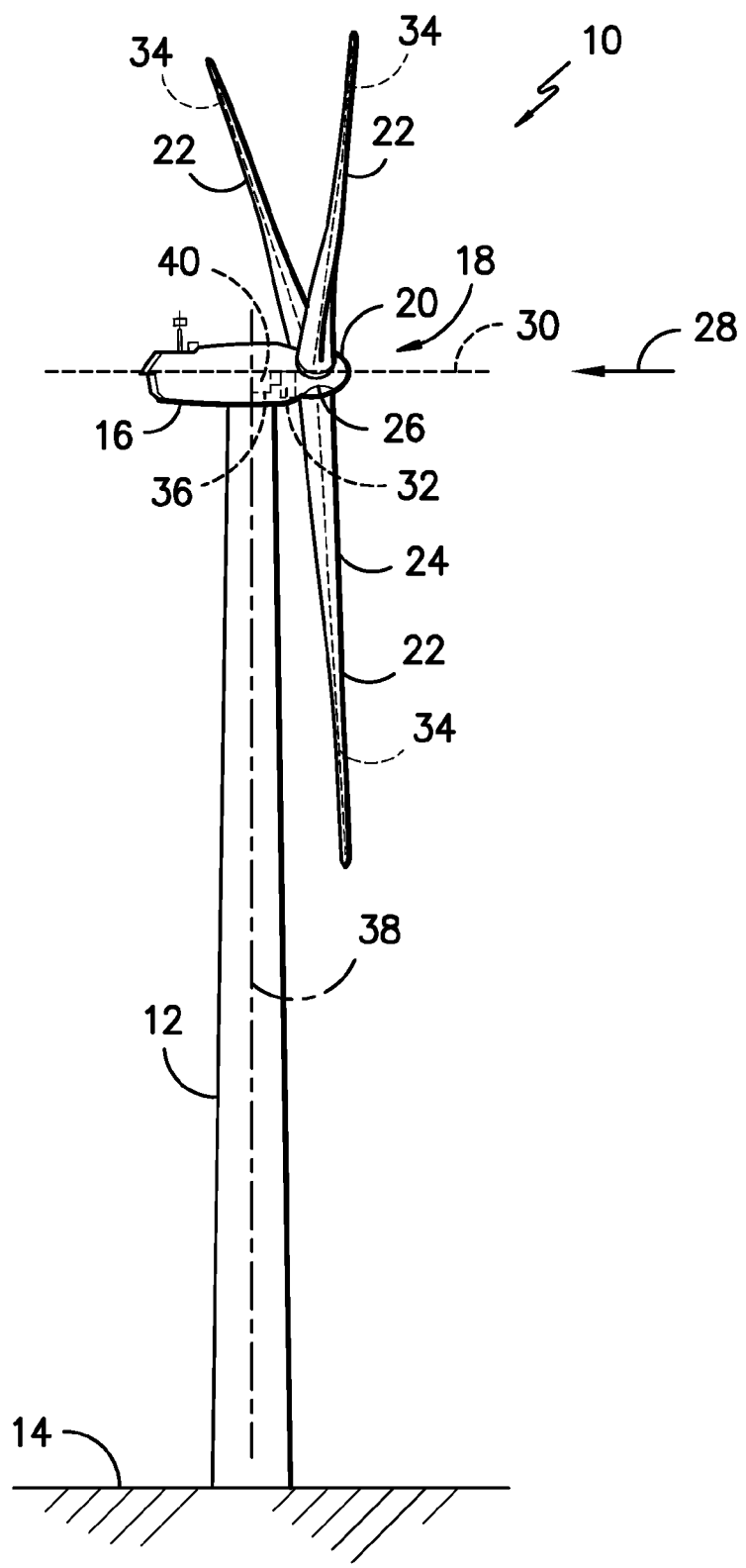
FIG. -1-

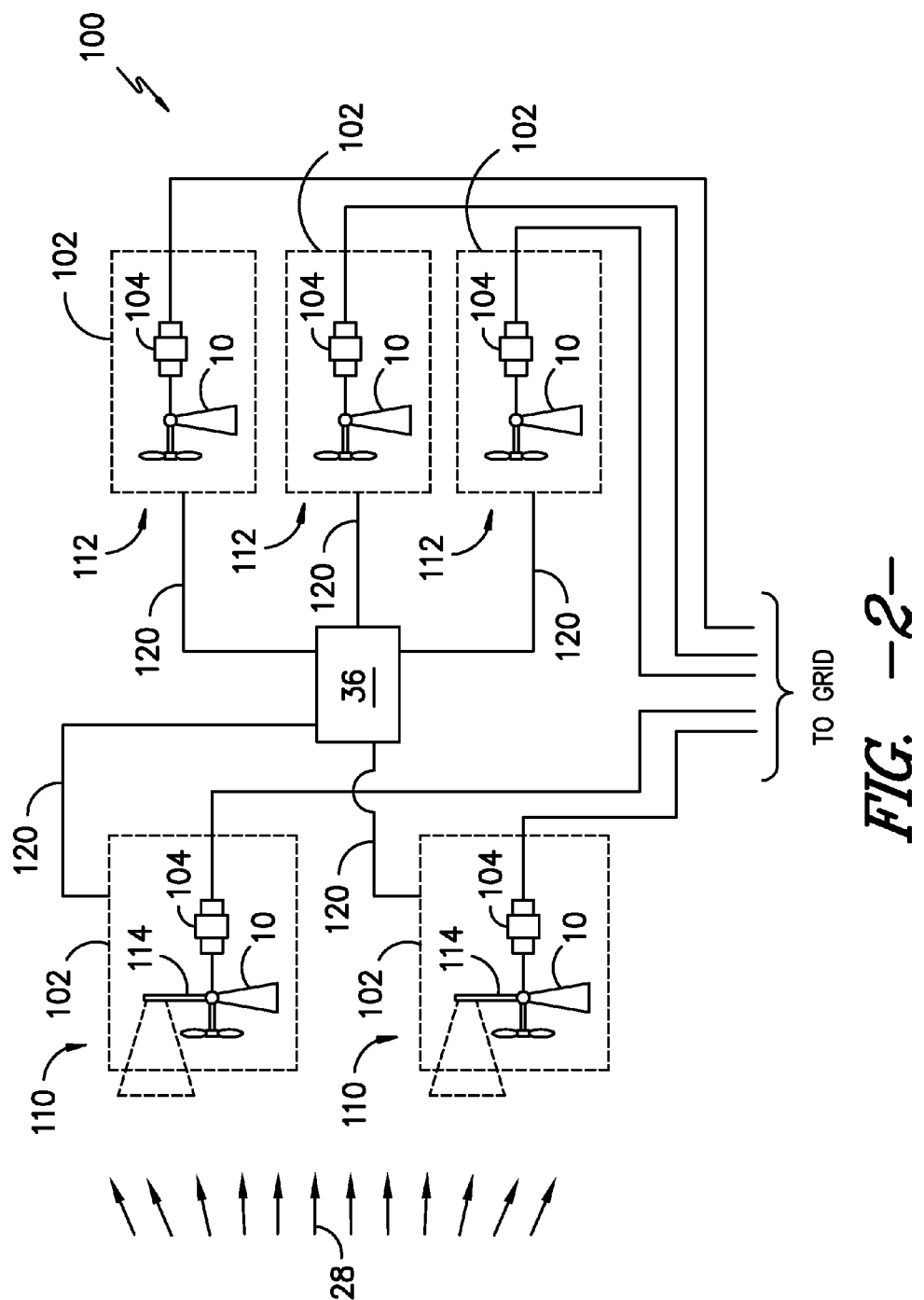
FIG. -2-

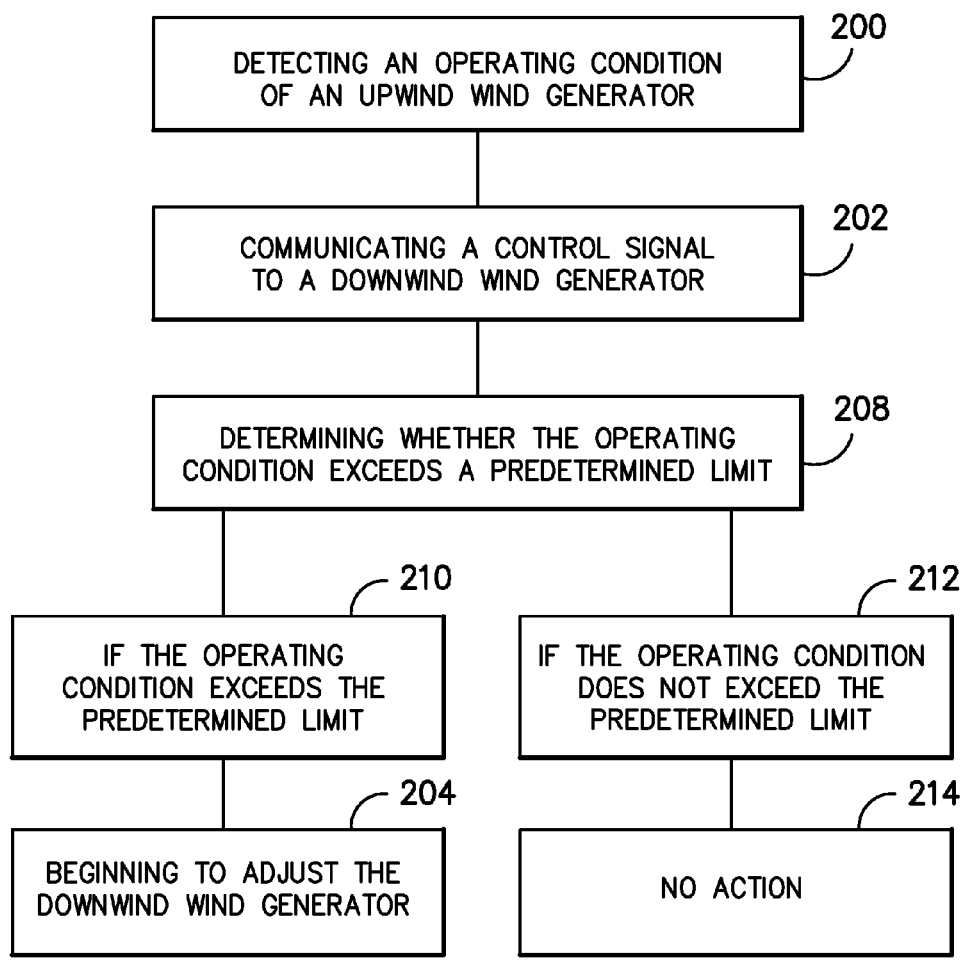
FIG. -3-

SYSTEM AND METHOD FOR OPERATING WIND FARM

FIELD OF THE INVENTION

The present disclosure relates generally to the field of wind farms, and more particularly, to systems and methods for adjusting wind generators in the wind farm based on operating conditions of upstream wind generators in the wind farm.

BACKGROUND OF THE INVENTION

Wind power is considered one of the cleanest, most environmentally friendly energy sources presently available, and wind generators have gained increased attention in this regard. A modern wind generator typically includes wind turbine and a generator. The wind turbine typically includes a tower, gearbox, nacelle, and one or more rotor blades. The generator is typically housed in the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid. Further, wind generators are typically grouped together in a wind farm, and may be onshore or offshore.

Typically, a wind generator is adjusted during operation to obtain optimal loading while avoiding excess loads due to, for example, wind gusts. For example, known wind generators may include atmospheric detection apparatus, such as wind vanes and anemometers, mounted on the wind turbine. Changes in atmospheric conditions, such as wind speed and direction, are experienced by the wind generator and simultaneously or soon thereafter detected by the atmospheric detection apparatus. The wind generator is then adjusted as required based on these experienced atmospheric conditions. For example, the pitch of the rotor blades, the yaw of the wind generator, and/or the torque of the generator may be adjusted.

However, the use of atmospheric detection apparatus mounted on wind generators and the detection thereby of experienced atmospheric conditions have a variety of disadvantages. For example, because the atmospheric conditions that are detected are already experienced by the wind generators, any changes in atmospheric conditions may affect the wind generators prior to adjustment thereof. Such changes in atmospheric conditions can thus damage the wind generators, particularly in the case of increased wind speeds, which can cause excess loading prior to detection and adjustment.

Accordingly, improved systems and methods for operating wind farms would be advantageous. For example, systems and methods that provide for anticipatory detection of atmospheric conditions and adjustment of wind generators would be desired.

BRIEF DESCRIPTION OF THE INVENTION

Aspects and advantages of the invention will be set forth in part in the following description, or may be obvious from the description, or may be learned through practice of the invention.

In one embodiment, a method for operating a wind farm is disclosed. The method includes detecting an operating condition of an upwind wind generator, the upwind wind generator located upstream of a downwind wind generator relative to a wind flow direction. The method further includes communicating a control signal to the downwind wind generator. The control signal is based on the operating condition. The method further includes beginning to adjust the downwind wind generator according to the control signal before the wind flow is experienced by the downwind wind generator.

In another embodiment, a system for operating a wind farm is disclosed. The system includes a downwind wind generator and an upwind wind generator. The upwind wind generator is located upstream of the downwind wind generator relative to a wind flow direction. The system further includes a control system in communication with the upwind wind generator and the downwind wind generator. The control system is configured to produce a control signal based on an operating condition of the upwind wind generator and communicate the control signal to the downwind wind generator. The downwind wind generator is adjustable according to the control signal before the wind flow is experienced by the downwind wind generator.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 is a schematic diagram of a wind farm according to one embodiment of the present disclosure; and FIG. 3 is a flow chart indicating the various steps of a method according to one embodiment of the present disclosure.

Repeat use of reference characters throughout the present specification and appended drawings is intended to represent same or analogous features or elements of the invention.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention encompass such modifications and variations as come within the scope of the appended claims and their equivalents.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support surface 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26. In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18. Such pitching (of blades individually and in combination) and otherwise adjusting of the rotor blades 22 and wind turbine 10 can decrease loading in both the blades 22 as well as in other components of the wind turbine 10. For example, torque and bending loads in a main shaft connecting the rotor 18 and a generator (discussed below) may be reduced, and bending of the tower 12 may be reduced. This can increase the life of these components and/or reduce the costs associated with wind turbine 10 design and operation.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28. A yaw adjustment system (not shown) may change the yaw direction.

In FIG. 1, control system 36 is shown as being centralized within nacelle 16, however, control system 36 may be a distributed system throughout wind turbine 10, on support surface 14, central to a plurality of wind turbines 10 in a wind farm (as shown in FIG. 2), and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Referring now to FIG. 2, a schematic diagram of a wind farm 100 is illustrated. The wind farm 100 includes one or more wind generators 102. A wind generator 102 according to the present disclosure includes, for example, one or more wind turbines 10 and one or more generators 104.

A wind turbine 10 and generator 104 in a wind generator 102 are coupled such that mechanical energy of the wind turbine 10 is supplied to the generator 104. The generator 104 may then store this energy and/or deploy the energy as desired or required. Typically, the rotor blades 22 of the wind turbine 10 transmit mechanical energy in the form of rotational energy so as to turn a shaft (not shown) coupling the rotor blades 22 to a gearbox (not shown), or if a gearbox is not used, directly to the generator 104. The generator 104 then converts the mechanical energy to electrical energy that may be deployed to a utility grid. To convert the mechanical energy to electrical energy, a generator stator (not shown) may be rotated with respect to a generator stator (not shown) due to rotation of the rotor blades 22.

A generator 104 for a wind generator 102 is typically housed in the nacelle 16 of the associated wind turbine 10. Alternatively, however, the generator 104 could be disposed outside of the nacelle 16 at any suitable location on or separate from the associated wind turbine 10.

As discussed, wind generators 102 are included in a wind farm 100. When more than one wind generator 102 is included in a wind farm 100, the wind generators 102 can have any suitable arrangement relative to one another. For example the wind generators 102 can be arranged in rows and/or columns, have any other suitable pattern, or be randomly arranged in the wind farm 100.

During operation of the wind farm 100, wind flow may travel through the wind farm and interact with the various wind generators 102 of the wind farm 100. Thus, one or more upwind wind generators 110 may experience this wind flow prior to one or more downwind wind generators 112, with reference to the direction 28 of this wind flow (and associated atmospheric conditions, as discussed below) past the upwind and downwind wind generators 110, 112. Further, as discussed above, it is desirable to provide anticipatory detection of, for example, changes in atmospheric conditions which may potentially damage one or more wind generators 102 in the wind farm 100. As such, the present disclosure provides systems and methods for beginning to adjust downwind wind generators 112 based on operating conditions experienced by upwind wind generators 110 due to the wind flow past the upwind wind generators 110, before the wind flow is experienced by the downwind generators 112. Such anticipatory detection allows the downwind wind generators 112 to adjust before experiencing the wind flow, thus reducing the risk of damage to the downwind wind generators 112 when the wind flow is experienced. Such adjustment according to the present disclosure need not necessarily be complete before the wind flow is experienced, but in exemplary embodiment is begun before the wind flow is experienced.

Thus, an upwind wind generator 110 may experience one or more operating conditions. Operating conditions include, for example, atmospheric conditions being experienced by the upwind wind generator 110; loading conditions being experienced by the upwind wind generator 110, such as due to the atmospheric conditions; and corrective actions being taken by the upwind wind generator 110, such as due to the atmospheric conditions or loading conditions (to, for example, reduce loading conditions).

For example, atmospheric conditions according to the present disclosure include wind, climate, and other atmospheric conditions that may affect the performance of a wind generator 102. For example, an atmospheric condition may be the direction 28 of wind, the speed of wind, the wind shear (difference in the speed of wind between an upper location and a lower location, such as between the top and bottom of a rotor 18) or the wind veer (difference in the speed of wind between two sideways locations, such as between the left and right side of a rotor 18).

An upwind wind generator 110 (and in fact, any or all wind generators 102), may thus, for example, include an atmospheric detection device 114, which may for example be mounted on the upwind wind generator 110. The atmospheric detection device 114 includes suitable hardware and software, such as a processor configured to perform the methods and/or steps described herein, for detecting, storing, and transmitting atmospheric conditions and data generated therefrom.

The device 114 in some embodiments may be, for example, a Light Detection and Ranging ("LIDAR") device. LIDAR in general is an optical remote sensing technology. A LIDAR device can measure various properties of a target area by illuminating the target with light, such as with laser pulses. Exemplary target areas are shown in FIG. 2 by dotted lines extending from the devices 114. Suitable LIDAR devices for detecting atmospheric conditions include, for example, Doppler LIDAR devices, Synthetic Array LIDAR devices, and Differential Absorption LIDAR devices.

Another suitable atmospheric detection device 114 is a Sonic Detection and Ranging ("SODAR") device. A SODAR device in general can measure the scattering of sound waves due to atmospheric turbulence, and can be used to measure, for example, wind speeds, the thermodynamic structure of the atmosphere, and other various atmospheric conditions. A suitable SODAR device for detecting atmospheric conditions is, for example, a Doppler SODAR device.

Other suitable atmospheric detection devices 114 include, for example, anemometers, such as cup anemometers; wind vanes; barometers; and radar devices, such as Doppler radar devices. Further, it should be understood that the present disclosure is not limited to the above disclosed atmospheric detection devices 114, and rather that any other suitable devices that can detect atmospheric conditions that may affect the performance of a wind generator 102 are within the scope and spirit of the present disclosure.

Loading conditions according to the present disclosure include, for example, tower 12 bending or twisting, rotor blade 22 bending or twisting, main shaft bending or twisting, and any other suitable deflection of any suitable component of a wind generator 102. These loading conditions are generally experienced by the wind generator 102, such as during operation of the wind generator 102, due to atmospheric conditions at the wind generator 102 and the wind flow past the wind generator 102. For example, sensors can be mounted on or adjacent to any of these components, to measure the deflection of this component during operation of the wind generator 102. Any suitable sensors, such as strain gauges, proximity sensors, etc., may be utilized to measure such deflection. The sensors may be in communication with the control system 36 and the pitch adjustment system 32 and yaw adjustment system, as well as other suitable adjustment systems, such that the wind turbine 10 and various components thereof may take corrective actions, as discussed below, in response to the loading conditions.

Corrective actions according to the present disclosure include, for example, pitch adjustment and rate of adjustment of one or more rotor blades 22 and yaw adjustment and rate of adjustment. In still other embodiments, the torque of the generator 104 may be adjusted. Still further, corrective action may include, for example, shutting the wind generator 102 down, cutting off power transfer between the wind generator 102 and the grid, or otherwise adjusting a characteristic of the wind generator 102 to alter how the wind generator 102 experiences atmospheric conditions. These adjustments are typically made due to the wind generator 102 experiencing increased atmospheric conditions and/or loading conditions. In many cases, the adjustments are made to reduce the loading conditions caused by increased atmospheric conditions, such as increases in wind flow speed due to gusts of wind. The corrective actions may be, for example, controlled by control system 36, as well as by pitch adjustment system 32, yaw adjustment system, and other suitable adjustment systems.

It should be understood that the atmospheric conditions at an upwind wind generator 110 need not be detected and communicated to a downstream wind generator 112 for the downwind wind generator 112 to appropriately and anticipatorily respond. For example, the downwind wind generator 112 may adjust based only on corrective actions communicated thereto, based on the logic that when the wind flow and associated atmospheric conditions reach the downwind wind generator 112, the same adjustments will be required. It should further be understood, however, that detection and communication of any suitable operating condition, including any individual or combination of corrective actions, loading conditions, or atmospheric conditions, and for any one or more upwind wind turbines 110, for communicating to and adjustment of any one or more downwind wind turbines 112, is within the scope and spirit of the present disclosure.

Thus, as discussed above, each upwind wind generator 110 can thus advantageously detect operating conditions, and changes therein, at upstream locations relative to the wind flow direction 28 and before these conditions reach one or more of the downwind wind generators 112. Such anticipatory detection of operating conditions allows the downwind wind generators 112 to be adjusted as required to accommodate for the upcoming wind flow and accompanying atmospheric conditions (and changes therein) before experiencing them. Thus, for example, wind gusts, increases or decreases in wind speed, or changes in wind direction can be detected and/or the downwind wind generators 112 can be adjusted to accommodate these changes in loading before the changes reach the downwind wind generators 112. Such anticipatory detection and adjustment may, for example, advantageously mitigate potential downwind wind generator 112 damage from, for example, excess loading due to the downwind wind generator 112 not being adjusted before experiencing changes in atmospheric conditions.

An upwind wind generator 110 may in exemplary embodiments be located a specified distance from a downwind wind generator 112. This specified distance may allow for an operating condition, or change thereof, to be communicated to the downwind wind generator 112, and may further allow for the downwind wind generator 112 to adjust as required. In some embodiments, the distance may be up to approximately 5 times the maximum diameter of the rotor 18 of the downwind wind generator 112, or between approximately 0.1 times and approximately 5 times the maximum diameter of the rotor 18 of the downwind wind generator 112. In other embodiments, the distance may be up to approximately 4 times, approximately 3 times, or approximately 2.5 times the maximum diameter, or between approximately 0.1 times and approximately 4 times, approximately 3 times, or approximately 2.5 times the maximum diameter. It should be understood, however, that the present disclosure is not limited to the above disclosed distances, and rather that any suitable distance is within the scope and spirit of the present disclosure.

To allow downwind wind generators 112 to anticipatorily adjust before experiencing wind flow and associated atmospheric conditions, the operating conditions detected by upwind wind generators 110 are communicated to the downwind wind generators 112. In particular, control signals based on the operating conditions may be communicated to the downwind wind generators 112. The downwind wind generators 112 may be adjusted according to the control signals. Further, such adjustment may advantageously occur before the operating conditions are experienced by the downwind wind generators 112.

To facilitate communication of the operating conditions and control signals, the control system 36 may be placed in communication with the upwind wind generators 110 and the downwind wind generators 112. As shown, for example, a central control system 36 may be provided between the upwind wind generators 110 and the downwind wind generators 112. Operating conditions detected by the upwind wind generators 110 may be communicated to the control system 36, which may in turn produce control signals based on these operating conditions. The control system 36 may thus be configured to produce control signals based on the operating conditions. The control signals may provide for adjustment of the downwind wind generators 112, and may be communicated to the downwind wind generators 112 for adjustment thereof.

In some embodiments, the control system 36 is, or includes, a supervisory control and data acquisition ("SCADA") system. A SCADA system is generally an industrial computer control system that monitors and controls various processes, in this case processes related to operation of one or more wind generators 102 in a wind farm 100. A SCADA system may include, for example, a human-machine interface, a supervisory system, a remote terminal unit, a programmable logic controller, and various suitable communications infrastructure and instrumentation to support these components. Any suitable SCADA system is within the scope and spirit of the present disclosure.

In other embodiments, operating conditions and control signals may be communicated directly between an upwind wind generator 110 and a downwind wind generator 112. For example, operating conditions detected by the upwind wind generator 110 may be turned into control signals internally in the upwind wind generator 110, such as by an internal control system, a pitch adjustment system 32, a yaw adjustment system, or another suitable upwind wind generator 110 system. These control signals may provide for adjustment of the downwind wind generators 112, and may be communicated directly to the downwind wind generators 112 for adjustment thereof.

Communication devices 120 are provided to communicate operating conditions to the control system 36 from the upwind wind generators 110, and to the downwind wind generators 112 from the control system 36, or alternately directly from the upwind wind generators 110 to the downwind wind generators 112. In exemplary configurations, a communications device 120 may include, but is not limited to, wire, fiber optic, and/or wireless transmission such as radio communications.

As discussed, a downwind wind generator 112 may be adjustable based on a control signal to anticipate a wind flow and associated atmospheric conditions. Any suitable adjustment may be made to the downwind wind generator 112. Such adjustments alter how the downwind wind generator 112 experiences the wind flow and associated atmospheric conditions. These adjustments may, for example, reduce, maintain, or increase the loading on the downwind wind generator 112, such as the wind turbine 10 and various components thereof as desired or required. These adjustments are typically corrective actions, such as any suitable corrective actions as discussed above. As discussed above, such adjustments according to the present disclosure are based on operating conditions detected by upwind wind generators 110, and may be made before the wind flow and associated atmospheric conditions experienced by the upwind wind generators 110, or changes therein, are experienced by the downwind wind generators 112. Thus, when the wind flow and associated atmospheric conditions reach and are experienced by the downwind wind generator 112, the downwind wind generator 112 has already been appropriately adjusted and is prepared to experience the wind flow and associated atmospheric conditions. Further, such appropriate adjustments allow for potential damage to a downwind wind generator 112 due to, for example, excess loading to be mitigated.

In some embodiments, the downwind wind generators 112 are adjusted constantly or at predetermined intervals based on the operating conditions of the upwind wind generators 110. In other embodiments, one or more of the operating conditions must meet or exceed a predetermined limit before a downwind wind generators 112 is adjusted. The predetermined limits are generally evaluated for the upwind wind generators 110. For example, in embodiments wherein the operating condition is an atmospheric condition, the atmospheric condition must meet or exceed a predetermined limit before a downwind wind generators 112 is adjusted. If the atmospheric condition is wind speed, for example, a predetermined maximum wind speed must be met or exceeded before the downwind wind generators 112 is adjusted. Similarly if the operating condition is a loading condition, such as main shaft bending, the main shaft must bend to or beyond a maximum angle or other suitable limit, and/or the operating condition must meet or exceed a predetermined limit, before the downwind wind generators 112 is adjusted. Still further, if the operating condition is a corrective action, such as a change in pitch angle, the pitch angle must change to or beyond a maximum angle or maximum allowed change in angle, and/or the corrective action must meet or exceed a predetermined limit, before the downwind wind generators 112 is adjusted. These various predetermined limits may be based on suitable tolerances for the wind generators 102, individually or as a group. The predetermined limits may be programmed into the control system 36 and/or into various individual systems in each wind generator 102.

The present disclosure is further direction to methods for operating wind farms 100, as indicated in FIG. 3. A method may include, for example, detecting operating conditions at upwind wind generators 110, as indicated by step 200. A method may further include communicating control signals to downwind wind generators 112, as indicated by step 202. The control signals may be based on the operating conditions, and may be produced and communicated by a control system 36 or produced and communicated directly between the wind generators 102 as discussed above. A method may further include beginning to adjust wind generators 102 according to the control signals, as indicated by step 204. Such adjustment may occur before the wind flow and associated atmospheric conditions are experienced by the wind generators 102.

Further, in some embodiments, the method may include determining whether the operating conditions exceed predetermined limits therefor, as indicated by step 208. In these embodiments, the beginning to adjust step 204 may occur only if one or more of the operating conditions meets or exceed the associated predetermined limits, as indicated by step 210. If one or more operating conditions does not meet or exceed the associated predetermined limits, as indicated by step 212, no adjustment may be made in accordance with the present method, as indicated by step 214. In exemplary embodiments, whether or not an operating condition meets or exceeds an associated predetermined limit, the various steps may then be repeated, beginning with the detecting step 200 as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind farm, the method comprising:
   detecting a corrective action taken by an upwind wind generator, the upwind wind generator located upstream of a downwind wind generator relative to a wind flow direction, the corrective action comprising an adjustment to a characteristic of the upwind wind generator;
   communicating a control signal to the downwind wind generator, the control signal based on the corrective action; and,
   beginning to adjust the downwind wind generator according to the control signal before the wind flow is experienced by the downwind wind generator,
   wherein the corrective action is one of a pitch adjustment, a pitch rate adjustment, a yaw adjustment, a yaw rate adjustment, or a generator torque adjustment.

2. The method of claim 1, wherein the wind generator comprises a wind turbine and a generator, and wherein the adjusting step comprises adjusting one of wind turbine pitch or wind turbine yaw.

3. The method of claim 1, further comprising:
   communicating the corrective action to a control system; and,
   producing from the control system a control signal based on the corrective action.

4. The method of claim 3, wherein the control system is a supervisory control and data acquisition system.

5. The method of claim 1, further comprising determining whether the corrective action exceeds a predetermined limit, and wherein the beginning to adjust step occurs only if the corrective action exceeds the predetermined limit.

6. The method of claim 1, further comprising detecting a plurality of corrective actions taken by the upwind wind generator.

7. The method of claim 1, wherein the upwind wind generator is a plurality of upwind wind generators.

8. A method for operating a wind farm, the method comprising:
   detecting a corrective action taken by each of a plurality of upwind wind generators, each of the plurality of upwind wind generators located upstream of a downwind wind generator relative to a wind flow direction, each corrective action comprising an adjustment to a characteristic of one of the plurality of upwind wind generators;
   communicating a control signal to the downwind wind generator, the control signal based on the corrective actions;
   determining whether at least one of the plurality of corrective actions exceed a predetermined limit, and
   if at least one of the plurality of corrective actions exceed the predetermined limit, beginning to adjust the downwind wind generators according to the control signal before the wind flow is experienced by the downwind wind generator,
   wherein the corrective action is one of a pitch adjustment, a pitch rate adjustment, a yaw adjustment, a yaw rate adjustment, or a generator torque adjustment.

9. The method of claim 8, wherein the downwind wind generator comprises a wind turbine and a generator, and wherein the adjusting step comprises adjusting one of wind. turbine pitch or wind turbine yaw.

10. The method of claim 8, further comprising:
    communicating the corrective actions to a control system; and,
    producing from the control system a control signal based on the corrective actions.

11. The method of claim 10, wherein the control system is a supervisory control and data acquisition system.

12. The method of claim 8, further comprising detecting a plurality of corrective actions taken by each of the plurality of upwind wind generators.

13. A system for operating a wind farm, the system comprising:
    a downwind wind generator;
    an upwind wind generator located upstream of a downwind wind generator relative to a wind flow direction; and
    a control system in communication with the upwind wind generator and the downwind wind generator, the control system configured to produce a control signal based on a corrective action taken by the upwind wind generator and communicate the control signal to the downwind wind generator, the corrective action comprising an adjustment to a characteristic of the upwind wind generator,
    wherein the downwind wind generator is adjustable according to the control signal before the wind flow is experienced by the downwind wind generator, and
    wherein the corrective action is one of a pitch adjustment, a pitch rate adjustment, a yaw adjustment, a yaw rate adjustment, or a generator torque adjustment.

14. The system of claim 13, wherein the downwind wind generator comprises a wind turbine and a generator, and wherein one of wind turbine pitch and wind turbine yaw is adjustable.

15. The system of claim 13, wherein the control system is a supervisory control and data acquisition system.

16. The system of claim 13, further comprising a plurality of upwind wind generators.

17. The system of claim 13, wherein the control system is in communication with the upstream wind generator and the downstream wind generator through one of wire, fiber optical, or radio communication.

* * * * *